Dec. 24, 1968 W. STELZER 3,418,024
PRESSURE METERING VALVE
Filed Aug. 6, 1964 2 Sheets-Sheet 1
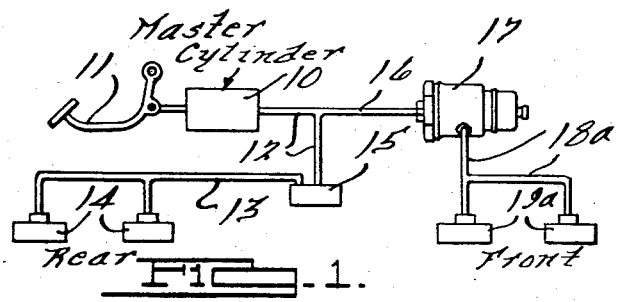
INVENTOR.
William Stelzer.

INVENTOR.
William Stelzer
BY
Harness, Dickey & Pierce
ATTORNEYS.

United States Patent Office 3,418,024
Patented Dec. 24, 1968

3,418,024
PRESSURE METERING VALVE
William Stelzer, Bloomfield Hills, Mich., assignor to Kelsey-Hayes Company, Romulus, Mich., a corporation of Delaware
Filed Aug. 6, 1964, Ser. No. 387,893
6 Claims. (Cl. 303—6)

ABSTRACT OF THE DISCLOSURE

There is disclosed herein a metering device adapted to delay the flow of fluid pressure from the master cylinder to the front brakes of a motor where the front wheels are equipped with disk brakes and the rear wheels are equipped with drum brakes. The device incorporates a plunger which can be moved manually to permit bleeding the brakes at a lower pressure.

---

This invention relates to hydraulic brake systems for automotive vehicles and, more particularly, to a metering valve adapted to delay the flow of pressure fluid to the front brakes where the front wheels are equipped with disk brakes and the rear wheels are equipped with duo-servo drum brakes.

While disk brakes normally produce a brake torque as soon as hydraulic pressure is applied, drum brakes, due to the heavy return springs, require a considerable hydraulic pressure before the brake shoes are expanded or moved sufficiently to produce a brake torque. The result is that the disk brakes do too much work and the rear brakes do too little work, particularly in the lower and medium ranges of brake application.

One of the primary objects of this invention is to delay the flow of hydraulic pressure to the disk brakes until the brake shoes of the rear drum brakes have expanded sufficiently to produce a brake torque.

Another important object of the invention is to provide a device of this type which will effect a gradual transition until the hydraulic pressure supplied the front and rear wheel cylinders is equal at a predetermined higher level.

Still another object of this invention is to effect or cause a hydraulic pressure difference between the front an rear wheel cylinders which remains constant until a certain or predetermined master cylinder pressure is attained and thereafter to blend the front wheel cylinders and the master cylinder pressures together until they become equal at a predetermined higher pressure level.

The device of this invention may be used in conjunction with a proportioning valve device for reducing the rear wheel cylinder pressure, as disclosed in my copending application, Ser. No. 386,697, filed July 31, 1964, now U.S. Patent No. 3,283,504. The proportioning valve shown in this application serves to correct the work load between the front and rear brakes during a high deceleration wherein a weight transfer to the front wheel occurs. The present metering valve is adapted to correct the work distribution on the brakes in the lower and middle pressure ranges.

The various objects and advantages, and the novel details of construction of two commercially practical embodiments of the invention, will become more apparent as this description proceeds, especially when considered in connection with the accompanying drawings, in which:

FIGURE 1 shows diagrammatically a hydraulic braking system embodying the metering valve of this invention;

FIGURE 2 is a longitudinal sectional view through the metering valve of this invention;

FIGURE 3 is an end view, looking from the left in FIGURE 2, certain parts being shown in section;

Figure 4:
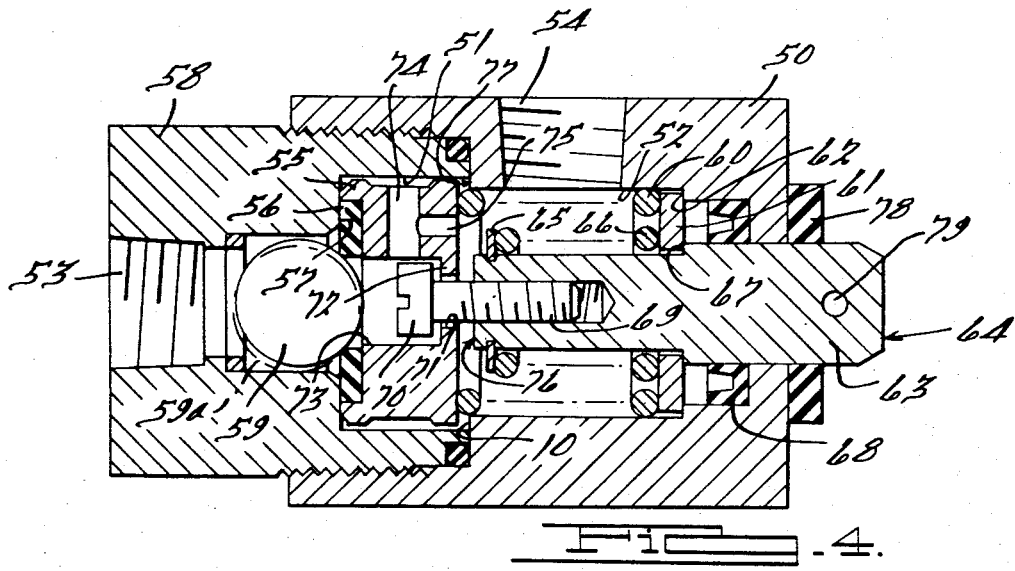
FIGURE 4 is a view similar to FIGURE 2 of a modified form of construction.

In the drawings, FIGURE 1 shows diagrammatically a hydraulic braking system for motor vehicles comprising a master cylinder 10 which is controlled by a brake pedal 11. The master cylinder 10 is connected by piping 12 and 13 to the rear wheel brake cylinders 14. Interposed between the piping 12 and 13 there may be included a proportioning valve 15 for reducing the pressure to the rear wheel cylinders 14, as disclosed in my copending application, Ser. No. 386,697, filed July 31, 1964. With the arrangement shown, there is no restriction to the flow of fluid pressure to the rear wheel brake cylinders unless the system includes the proportioning valve 15. The master cylinder 10 is connected by piping 16 to a metering valve 17 forming the particular subject matter of this invention. This metering valve is connected by piping 18a to the front wheel cylinders 19a.

The metering valve 17 comprises a casing or valve body 18 provided with a cylinder or chamber 19, one end of which is closed by a plug 20 threadedly engaging the casing 18, an O-ring type seal 21 being preferably interposed between the plug 20 and the casing 18. The end of the plug 20 is preferably provided with a tapped opening 22 to provide a connection for the end of the piping 16 from the master cylinder. The plug is also provided with a bore or passage 23 connecting the inlet 22 to the cylinder 19.

Arranged within the cylinder 19 is a valve piston 24 which is provided on one face with a sealing gasket or valve member 25 which seats against the end face 26 of the plug 20 to close the inlet passage 23 from the master cylinder. A spring 27 engages and end wall or face 28 of the cylinder 19 and an annular flange 29 on the piston 24. This spring 27 normally urges the piston 24 to the left, as viewed in FIGURE 2 to seat the sealing ring 25 on the face 26 to close the port 23.

In the example shown in the drawings, the spring 27 has sufficient strength to resist movement of the piston 24 to the right until approximately 100 p.s.i. has been attained at the inlet port 23. Pressure in excess of 100 p.s.i. moves the piston towards the right against the biasing action of the spring 27 and permits fluid under pressure from the master cylinder to flow through and around the piston to an outlet 30 connected as at 31 to the piping 18a leading to the front wheel cylinders. The flange 29 of the piston is provided on its periphery with serrations or grooves 31 to permit the fluid to flow around the piston to the outlet 30.

The piston 24 is hollow to provide an interior recess 32. The recess 32 is connected by radially extending ports or apertures 33 to the exterior of the piston so that fluid entering the interior recess 32 of the piston may, under certain conditions, flow out of the piston and into the outlet port 30 and vice versa.

Associated with the piston 24 is a plunger member 34 which is slidably supported as at 35 in the casing 18 and extends to the exterior of the casing so that it is exposed to atmospheric pressure. The plunger 34 is slidably mounted in the piston 24 and in a reduced diameter portion 24a of the piston. The plunger 34, adjacent its outer end, is provided with a sealing member or packing 36. This seal 36 is arranged between the end 18b of the casing 18 and the piston portion 24a.

The inner end portion of the plunger member 34 is provided with an annular check valve 37 which may be, and preferably is, formed of a flexible material, such as rubber. The plunger member 34 is provided with a headed portion 34a against which the check valve 37 seats in its closed position to close a substantially annular longitudinally extending passageway 38 formed in the piston 24. Thus, when fluid under pressure enters the interior recess 32 of the piston, it will first close the check valve 37 and then attempt to move the piston 24 to the right, as viewed in FIGURE 2, against the pressure of the spring 27. The check valve 37 opens to permit the return flow of fluid from the wheel cylinders when the brakes are released. The return flow is through the grooves 31 and the ports 33. The plunger member 34 has a projection 39 provided with a longitudinal opening 40 and one or more lateral openings 41 for use in bleeding the brake system, as will be described later. However, during the brake application, the plunger 34 moves with the piston 24 and may, as a practical matter, be considered as a part of the piston 24.

Fluid pressure in the recess 32 acts against the piston 24 over an effective area of circular shape having the diameter of the sealing lip of the gasket 25. This area may be termed area "X." The force generated by fluid acting against area X opposes the force of the spring 27 in an effort to move the piston 24 to the right. The point at which the spring 27 will yield to permit fluid to bleed past the gasket 25 may be accurately established by selecting the spring 27 with reference to the size of area X. It will be noted that when fluid is permitted to flow to the outlet 30 and the front wheel cylinders 19a by movement of the piston 24, outlet fluid pressure, equal to the pressure present in the front brake cylinder 19a, will prevail in the chamber 19 and act against piston 24 in a direction assisting the spring 27. However, the effective area of the piston 24 against which such fluid pressure acts is less than the area X by an amount equal to the cross sectional area of the plunger 34 (nominally "Y"). This is so because the right-hand end of the plunger 34 is sealed off from front wheel brake pressure and is subject only to atmospheric pressure. The assistance given the spring 27 by front wheel brake pressure will tend to reclose the gasket 25 against the face 26. However, a further increase in master cylinder pressure will tend to open the gasket or valve 25 again. Thus, the gasket tends to undergo a fluttering action, bleeding small quantities of fluid in a direction from the inlet to the outlet. The piston 24 moves in a manner tending to balance the forces acting on it. Assumming the force of the spring 27 is "S," inlet pressure is $P_i$ and outlet pressure is $P_o$, the following formula will hold:

$$P_i X = S + P_o (X - Y)$$

The above formula will govern until $P_i$ becomes so large that S can no longer compensate for the reduced area of X–Y. At this pressure level, the spring 27 will collapse and the valve member or gasket 25 will remain open until the vehicle operator reduces the applied brake pressure. Once the valve 25 remains, front and rear brake pressures will be equal.

In analyzing the above formula, it will be apparent that a given unit increase in $P_i$ will produce a somewhat larger unit increase in $P_o$. For this reason, $P_o$, which is initially lower than $P_i$, gradually becomes equal to $P_i$. Thus, the device of the present invention effects a blending of $P_o$ into $P_i$ through a smooth transition period, permitting $P_o$ to be initially reduced without sacrificing $P_o$ at the higher ranges where it is needed.

Figure 5:
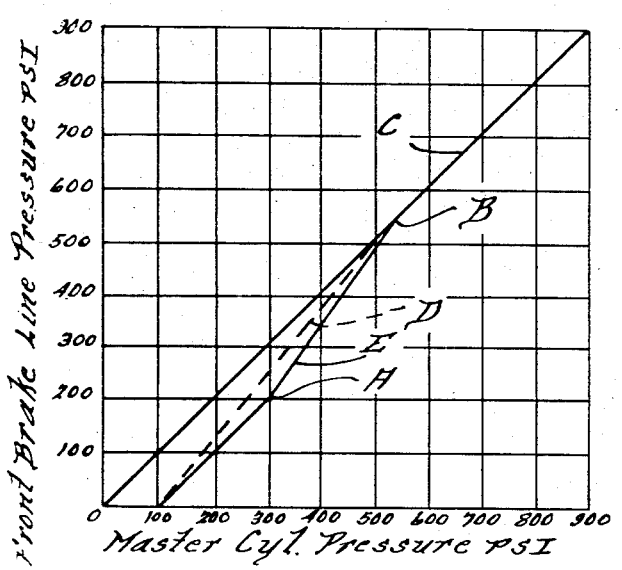
FIGURE 5 is an explanatory graph showing the variations in pressure transmitted to the front wheel cylinders for both forms of the invention.

In the example shown, the differential pressures between the master cylinder and the front wheel cylinders is maintained until the master cylinder pressure reaches 100 p.s.i., as shown in the graph, FIGURE 5. Beginning at this point, the front wheel cylinder pressure is gradually blending into master cylinder pressure, as shown by dotted line D. Finally, front wheel pressure merges at point B with the master cylinder hydraulic pressure which is indicated by line C. From point B on, the valve 25 remains open and the pressures are equal.

Secured to the extension 18b of the device is a hood 42 of flexible material, preferably rubber, which surrounds and seals the end of the plunger member 34 and is provided with an annular restricted portion 43 which engages an annular reduced poriton 44 on the plunger member 34. The hood member 42 does not interfere with the free movement of the plunger member 34 during the operation of the metering device. When it is desired to bleed the system, the outer end of the plunger member 34 is pressed inwardly. This holds the check valve 37 away from its seat on the valve piston and away from the annular opening 38. At the same time, the projection 39 is seated on the end of the inlet passage 23 so that fluid may flow from the master cylinder through the openings 40 and 41 and through the valve piston passages 38 and 33 to the outlet opening 30 connected to the front wheel brakes. This bypasses the main portion of the valve piston so that the system may be bled without increasing the master cylinder pressure.

In FIGURE 4, a slightly modified form of construction is illustrated, in which the device consists of a casing or valve body 50 provided with a first cylinder or chamber 51 which is open to a coaxial second cylinder or chamber 52. The reference character 53 indicates a tapped opening by means of which a connection is made with the piping 16 from the master cylinder. The reference character 54 indicates a tapped opening by means of which a connection is made with the piping 18a to the front wheel cylinders.

Arranged in the cylinder 51 is a valve piston 55 provided with a sealing member 56. This sealing member is adapted to engage an annular seating surface 57 on a plug 58 which closes the end of the casing or valve body 50.

The reference character 59 indicates a check valve in the form of a ball, which normally reposes in the dot and dash position 59a. When fluid under pressure is admitted from the master cylinder through the tapped inlet opening 53, the ball is whisked from its position of repose indicated at 59a to its full line position where it engages the seal 56 on the valve piston 55 to prevent the flow of pressure fluid therethrough.

The valve piston 55 is normally biased towards the left into closed position by means of an outer spring 60, one end of which engages the valve piston and the other end of which is seated on an abutment washer 61 secured in the casing 50 against the annular shoulder 62. In the example given, the strength of the spring 60 is such that the valve piston 55 will not open or move from its seat until a pressure of approximately 100 p.s.i. is obtained in the cylinder line at the inlet 53.

Associated with the valve piston 55 and forming a part of a piston assembly with the piston 55 is a plunger member 63, the outer end 64 of which is exposed to atmosphere and the inner end of which carries an abutment washer 65. An inner spring 66 engages the abutment washer 65 on one end and the abutment washer 61 on the other end to normally urge the plunger member 63 to the left, as viewed in FIGURE 4. In this position, an annular shoulder 67 engages the abutment washer 61 to limit the movement to the left of the plunger member 63. The casing or valve body 50 may be provided with a seal 68 surrounding the plunger member 63 to seal the same.

The inner end of the plunger member 63 has a loose or lost-motion connection with the valve piston 55. This connection may be in the form of a threaded member or bolt 69 threaded into the inner end of the plunger member 63 and having a head 70. The bolt 69 passes through an aperture 71 in the piston and the head 70 is adapted to engage a flange 72 surrounding the aperture 71.

When the fluid under pressure is supplied by the master cylinder through the inlet 53, it first seats the check valve ball 59 against the seal 56 and then pressure on the check valve and valve piston tends to move these two elements to the right, as viewed in FIGURE 4, against the action of spring 60. In the embodiment shown, nothing happens until the master cylinder line pressure reaches approximately 100 p.s.i., whereupon the pressure moves the valve piston 55 to the right against the action of the outer spring 60. The pressure of fluid at the outlet will also be exerted against the valve piston 55 in a direction assisting the spring 60. For instance, if the master cylinder pressure is 125 p.s.i., 25 p.s.i. of fluid will flow through the outlet 54 to the front wheel cylinders in the specific device described. To permit the flow of fluid to the outlet opening 54, the piston 55 is provided with a central bore or opening 73, one or more axial openings 74, and one or more longitudinal openings 75. The fluid can flow around the valve piston 55 or through the openings 74 and 75 to the cylinder 52 and thence through the openings 54 to the piping 18a to the front wheel cylinders.

From the description thus far, it will be understood that the pressure transmitted to the front wheel cylinders is always approximately 100 p.s.i. less than the master cylinder pressure. This differential pressure between the master cylinder and the front wheel cylinders is maintained until the pressure to the front wheel cylinders reaches some greater level; for example 200 p.s.i., as shown by line E which ends at point A on the graph, FIGURE 5. At this point, the spring 66 is designed to yield under the influence of front wheel cylinder pressure acting on the inner end surface 76 and the shoulder 67 of the plunger member 63, permitting the plunger member 63 to move to the right. This movement of the plunger 63 moves the head 70 into engagement with the piston flange 72 and the continued movement of the plunger 63 assists in moving the valve piston 55 to the right against the action of the outer spring 60 until finally the effect of the outer spring 60 is completely cancelled out. The front wheel brake pressure between the time of collapse of the spring 66 and collapse of the spring 60 is indicated by the line E of the graph, which extends between points A and B. During this period, the valve piston 55 and the plunger member 63 function as one unit in a manner similar to the piston 24 of the embodiment of FIGURES 1–3 to blend front brake pressure into master cylinder pressure. This, of course, results from the fact that the effective area of the combined piston 55 and plunger 63 (which together form "piston means," as that phrase is used herein) subject to front wheel cylinder pressure is less than the opposite area of such piston means subject to master cylinder pressure. The combined pressure exerted on the plunger 63 and the valve piston 55 gradually cancels the force of the outer spring 60 and finally moves the valve piston to the right so that the seal 56 thereafter remains open with the application of the same or increased pressure from the master cylinder. In this position of the parts, fluid pressure from the master cylinder flows through the device in an unrestricted manner to the front wheel cylinders. At this point, the pressure being transmitted to the front wheel cylinders is the same as the pressure in the master cylinder line, as indicated by the line C in the graph.

An added sealing member 78 may be provided around the plunger member 63 on the exterior of the valve body or casing 50. The plunger 63 may, if desired, be provided with an opening 79 for the reception of a tool whereby the plunger member 63 and the valve piston 55 may be forcibly moved to the right against the action of the springs 60 and 66 to bleed the wheel cylinders.

From the foregoing description, it will be noted that the embodiment of FIGURE 4 provides a two-stage metering device action which delays the blending of front brake pressure into master cylinder pressure until a higher pressure range is reached. In many brake systems, this may be a distinct advantage and provide a more nearly optimum usage of both front and rear brakes.

In both embodiments, it will be apparent that a smooth transfer of front brake pressure is achieved to provide optimum use of the front brakes during high energy stops, yet avoid overuse of brakes during low energy stops.

What is claimed is:

1. In a hydraulic brake system comprising a master cylinder, front and rear wheel brake cylinders, and means hydraulically connecting said master cylinder to said wheel cylinders, that improvement which comprises a metering valve device in the hydraulic connection between said master cylinder and front wheel cylinders for initially maintaining a differential pressure in said front and rear wheel cylinders and subsequently merging said pressures into a uniform pressure, said device comprising a cylinder connected adjacent one end to said master cylinder and connected to said front wheel cylinders, a valve piston in said cylinder for closing the connection with the master cylinder, spring means for biasing said valve piston into closed position, a spring biased plunger member associated with said valve piston, said plunger member being exposed at one end to atmospheric pressure and at its other end to the hydraulic pressure flowing to said front wheel cylinders, a lost-motion connection between said plunger member and valve piston, a velocity responsive check valve associated with said valve piston opposing the flow of pressure fluid therethrough, said valve piston being moved to open position against the action of said first mentioned spring after attainment of a predetermined pressure in said master cylinder acting on said check valve and valve piston to permit a metered amount of hydraulic fluid to flow to said front wheel cylinders, a predetermined further increase in the master cylinder pressure acting on said valve piston and plunger member to move said plunger member against the action of its spring and through said lost-motion connection to assist in moving said valve piston to fully open position to permit the free flow of master cylinder pressure fluid to said front wheel cylinders.

2. In a hydraulic brake system comprising a master cylinder, front and rear wheel brake cylinders, and means hydraulically connecting said master cylinder to said wheel cylinders, that improvement which comprises a metering valve device in the hydraulic connection between said master cylinder and front wheel cylinders for initially maintaining a differential pressure in said front and rear wheel cylinders and subsequently merging said pressures into a uniform pressure, said device comprising a cylinder connencted adjacent one end to said master cylinder and connected to said front wheel cylinders, a valve piston in said cylinder for closing the connection with the master cylinder, passage means connecting said cylinder with said master cylinder, spring means for biasing said valve piston into closed position, a plunger member associated with said valve piston, said plunger member being exposed at one end to atmospheric pressure and at its other end to the hydraulic pressure fluid flowing to said front wheel cylinders, said plunger member having an apertured extention on one end and being movable relative to said valve piston and said passage means to connect said apertured extension with the master cylinder whereby the system may be bled without increasing the master cylinder pressure, said valve piston being moved to open position after attainment of a predetermined pressure in said master cylinder to permit a metered amount of hydraulic fluid to flow to said front wheel cylinders, a predetermined further increase in the master cylinder pressure acting on said valve piston and plunger member to move said valve piston to fully open position to permit the free flow of master cylinder fluid to said front wheel cylinders.

3. A metering valve for hydraulic brake systems comprising a body portion having an inlet arranged to receive hydraulic pressure from a master cylinder and an outlet arranged to transmit hydraulic pressure to a brake cylinder passage means normally connecting said inlet to said outlet, a pressure responsive valve adapted to close said passage, first spring means urging said valve to a closed position against master cylinder pressure, said valve being exposed to master cylinder fluid pressure and brake cylinder fluid pressure on opposite sides thereof, a plunger exposed to brake cylinder fluid pressure on one side thereof and atmospheric pressure on the other side thereof, second spring means biasing said plunger in a direction opposing the force produced on said plunger by brake cylinder pressure, means connecting said plunger to said valve whereby said plunger will apply a force to said valve opposing said first spring means over a pressure range greater than the pressure at which said valve will normally open against said first spring means in response to master cylinder pressure and a normally open check valve arranged to permit return flow of fluid from said outlet to said inlet and to close in response to fluid flow from said inlet to said outlet.

4. In a hydraulic brake system comprising a master cylinder, front and rear wheel brake cylinders, and means hydraulically connecting said master cylinder to said wheel cylinders, that improvement which comprises a metering valve device in the hydraulic connection between said master cylinder and said front wheel cylinders for initially maintaining a differential pressure in said front and rear wheel cylinders, said device comprising a cylinder connected adjacent one end to said master cylinder and connected to said front wheel cylinders, a valve piston in said cylinder for blocking the flow of fluid pressure from said master cylinder to said front wheel cylinders, said valve piston having a bypass opening therein, spring means for biasing said valve piston to a closed position, a separate plunger member associated with said valve piston, said plunger member being exposed at one end to atmospheric pressure and at its other end to the hydraulic pressure flowing to said front wheel cylinders, a check valve operable to block the flow of fluid pressure from said master cylinder to said front wheel cylinders, said plunger member being manually movable to open a path for the flow of fluid past said valve piston at relatively low master cylinder pressures for bleeding of the brakes.

5. The structure set forth in claim 4 wherein said check valve is carried by said plunger.

6. The structure set forth in claim 4 including means carried by said plunger operable to open said valve piston upon manual movement of said plunger in a given direction.

References Cited

UNITED STATES PATENTS

| | | | |
|---|---|---|---|
| 2,095,560 | 10/1937 | Vickers | 303—84 |
| 3,304,130 | 2/1967 | Doerfler | 303—6 |

MILTON BUCHLER, *Primary Examiner.*

J. J. McLAUGHLIN, *Assistant Examiner.*

U.S. Cl. X.R.

60—54.5; 137—470; 188—152